US 8,392,891 B2

(12) United States Patent
Burckhardt et al.

(10) Patent No.: US 8,392,891 B2
(45) Date of Patent: Mar. 5, 2013

(54) TECHNIQUE FOR FINDING RELAXED MEMORY MODEL VULNERABILITIES

(75) Inventors: Sebastian Burckhardt, Sammamish, WA (US); Madanlal Musuvathi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1120 days.

(21) Appl. No.: 12/147,079

(22) Filed: Jun. 26, 2008

(65) Prior Publication Data

US 2009/0328045 A1    Dec. 31, 2009

(51) Int. Cl.
*G06F 9/46* (2006.01)
(52) U.S. Cl. .................................. 717/130; 717/124
(58) Field of Classification Search .................. None
See application file for complete search history.

(56) References Cited

U.S. PATENT DOCUMENTS

| 3,937,938 | A | 2/1976 | Matthews |
| 5,790,778 | A | 8/1998 | Bush et al. |
| 5,893,165 | A | 4/1999 | Ebrahim |
| 6,286,130 | B1 | 9/2001 | Poulsen et al. |
| 6,892,286 | B2 | 5/2005 | Hangal et al. |
| 7,814,378 | B2 * | 10/2010 | Manovit et al. ............... 714/718 |
| 2002/0194457 | A1 | 12/2002 | Akkary |
| 2006/0129765 | A1 | 6/2006 | Rose et al. |
| 2007/0198785 | A1 | 8/2007 | Kogge et al. |
| 2008/0288834 | A1 * | 11/2008 | Manovit et al. ............... 714/718 |

OTHER PUBLICATIONS

Park et al., An Executable Specification, Analyzer and Verifier for RMO (Relaxed Memory Order), In SPAA, pp. 34-41, 1995.*
Manson et al, The Java Memory Model,In Principles of Programming Languages (POPL), pp. 378-391, 2005.*
Burckhardt et al, Memory Model Safety of Programs, Microsoft Research, Jul. 2008.*
Burckhardt et al, Bounded Model Checking of Concurrent Data Types on Relaxed Memory Models: A Case Study, 2006.*
Adve, et al., "Shared Memory Consistency Models: A Tutorial", Sep. 1995, pp. 1-23.
"Alpha Architecture Reference Manual", Compaq Computer Corporation, Jan. 2002, pp. 984.
Burckhardt, et al., "Bounded Model Checking of Concurrent Data Types on Relaxed Memory Models: A Case Study", Springer-Verlag Berlin Heidelberg, 2006, pp. 489-502.
Burckhardt, et al., "CheckFence: Checking Consistency of Concurrent Data Types on Relaxed Memory Models", ACM, 2007, pp. 1-10.
Burckardt, et al., "Effective Program Verification for Relaxed Memory Models", Jan. 31, 2008, pp. 13.
Burckhardt, et al., "Memory Model Safety of Programs", Microsoft Research, Workshop on Exploiting Concurrency Efficiently and Correctly, Available at <<http://research.microsoft.com/pubs/75772/burckhardt-musuvathi-ec2-08.pdf>>, Jul. 2008, 4 pgs.
Clara, "The SPARC Architecture Manual Version 9", SPARC International, Inc., 2000, pp. 393.
Fang, et al., "Automatic Fence Insertion For Shared Memory Multiprocessing", ACM, 2003, pp. 285-294.
Flanagan, et al., "Dynamic Partial-Order Reduction For Model Checking Software", ACM, 2005, pp. 110-121.

(Continued)

*Primary Examiner* — Li B Zhen
*Assistant Examiner* — V Miller
(74) *Attorney, Agent, or Firm* — Lee & Hayes, PLLC

(57) ABSTRACT

A system and method capable of finding relaxed memory-model vulnerabilities in a computer program caused by running on a machine having a relaxed memory model. A relaxed memory model vulnerability in a computer program includes the presence of program executions that are not sequentially consistent. In one embodiment, non-sequentially consistent executions are detected by exploring sequentially consistent executions.

19 Claims, 8 Drawing Sheets

OTHER PUBLICATIONS

Godefroid, "Model Checking for Programming Languages using VeriSoft", ACM, Jan. 1997, pp. 14.

Godefroid, "Partial-Order Methods for the Verification of Concurrent Systems: An Approach to the State-Explosion Problem", 1994-1995, pp. 136.

Gopalakrishnan, et al., "QB or not QB: An efficient execution verification tool for memory orderings", Springer-Verlag Berlin Heidelberg, 2004, pp. 401-413.

Hangal, et al., "TSOtool: a program for verifying memory systems using the memory consistency model", IEEE, 2004, pp. 10.

Hill, "Multiprocessors Should Support Simple Memory-Consistency Models", IEEE, 1998, pp. 7.

Huynh, et al., "A memory model sensitive checker for C#", pp. 16, 2006.

"Intel 64 and IA-32 Architectures Software Developers Manual", Intel Corporation, 1997, pp. 646.

"Intel 64 Architecture Memory Ordering White Paper", Interl Corporation, Aug. 2007, pp. 13.

Lamport, et al., "A New Solution Of Dijkstras Concurrent Programming Problem", ACM, vol. 17, No. 8, Aug. 1974, pp. 453-455.

Lamport, "How To Make A Multiprocessor Computer That Correctly Executes Multiprocess Programs", Feb. 14, 1993, pp. 11.

Manovit, et al., "Efficient Algorithms for Verifying Memory Consistency", Sun Microsystems, Inc., 2005, pp. 8.

Manson, et al., "The Java Memory Model", ACM, 2005, pp. 14.

Musuvathi, et al., "Fair Stateless Model Checking", Jan. 3, 2008, pp. 13.

Musuvathi, et al., "Iterative Context Bounding for Systematic Testing of Multithreaded Programs", ACM, pp. 9, 2007.

Park, et al., "An Executable Specification, Analyzer And Verifier For RMO (Relaxed Memory Order)", ACM, 1995, pp. 34-41.

Pong, et al., "Formal automatic verification of cache coherence in multiprocessors with relaxed memory models", Hewlett-Packard, Feb. 2000, pp. 42.

"PowerPC Operating Environment Architecture Book III", Jan. 28, 2005, pp. 135.

"PowerPC User Instruction Set Architecture Book I", IBM, Jan. 28, 2005, pp. 230.

"PowerPC Virtual Environment Architecture Book II", Jan. 28, 2005, pp. 68.

Shasha, et al., "Efficient And Correct Execution Of Parallel Programs That Share Memory", ACM, vol. 10, No. 2, 1988, pp. 282-312.

"Understand The Impact Of Low-Lock Techniques In Multithreaded Apps", at <<http://msdn.microsoft.com/msdnmag/issues/05/10/MemoryModels/>>, Microsoft Corporation, 2008, pp. 12.

Yang, et al., "Memory-Model-Sensitive Data Race Analysis", pp. 16, 2004.

Yang, et al., "Nemos: A Framework For Axiomatic And Executable Specifications Of Memory Consistency Models", pp. 15, 2004.

Yang, et al., "Rigorous Concurrency Analysis Of Multithreaded Programs", pp. 10, 2003.

"z/Architecture Principles of Operation", IBM, 2001, pp. 1024.

\* cited by examiner

TECHNIQUE FOR FINDING RELAXED MEMORY MODEL VULNERABILITIES

BACKGROUND

Developers of performance-critical multi-threaded software often try to avoid the overhead of traditional locking. Traditional techniques for doing so include making direct use of hardware primitives for atomic operations (such as interlocked exchange, or compare and swap) or employing regular loads and stores for the purpose of synchronization. Unfortunately, such "low-lock" programs are notoriously difficult to implement systems with a relaxed memory consistency model. Subtle bugs can arise in these programs due to memory operation reordering caused by the relaxed memory model of the underlying hardware. These errors are hard to find and debug as they most often show up only in specific thread interleavings and in particular hardware configurations.

Low-lock code is used heavily both in low-level libraries and in critical paths of a system. Because these parts of the system are crucial to the reliability of the entire system, it is important to develop verification techniques. However, the high degree of non-determinism in relaxed memory consistency models challenges standard verification techniques.

Previous attempts to programmatically find relaxed memory model bugs have attempted to solve the problem by modeling the potential executions of a program executing on a computer having a relaxed memory model. Due to the afore-mentioned non-determinism, these attempts do not scale.

The memory consistency model is one of the major attributes of shared memory multiprocessor systems. It establishes a contract between the hardware and software regarding the behavior of accesses to shared memory. Its implication is not only limited to functionality; it also impacts performance and programmability of the system as well as portability on the software side and compatibility on the hardware side.

SUMMARY

This document describes techniques capable of finding bugs in a computer program caused by running the computer program on a machine having a relaxed memory model. In one embodiment, an analysis algorithm, embodied in a "relaxed memory model error detection module" or "detection module", executes the program under test in many ways, through many different code paths. Each distinct code path is known as an "execution" of the program under testing. The analysis algorithm may detect the existence of non-sequentially consistent executions of the program under test while analyzing only sequentially consistent executions of the program under test. In one embodiment, individual executions of the program under test, such as executions obtained by running the program in a testing environment, are analyzed by the detection module. In another embodiment, all executions of the program are systematically enumerated and analyzed by the detection module. In one embodiment, the detection module is run simultaneously with the program under test; in another embodiment, a trace file is first generated from the program under test and the detection module analyzes that trace file offline.

In yet another embodiment, the detection module receives a memory trace comprising a plurality of memory access events each representing the execution of a memory access instruction issued by the program under test on a computer having a sequentially consistent memory model. The detection module determines whether the memory access instructions could, when executed on a computer having a relaxed memory model, be executed in an order in which they could not have been executed on the sequentially consistent computer. The result of the determination is an indication whether or not the memory access instructions, and thus the test computer program they were derived from, are relaxed memory model safe.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

FIG. 2C illustrates the execution of a simple set of memory access instructions that may achieve different results based on which memory model they are executed on.

DETAILED DESCRIPTION

Figure 1:
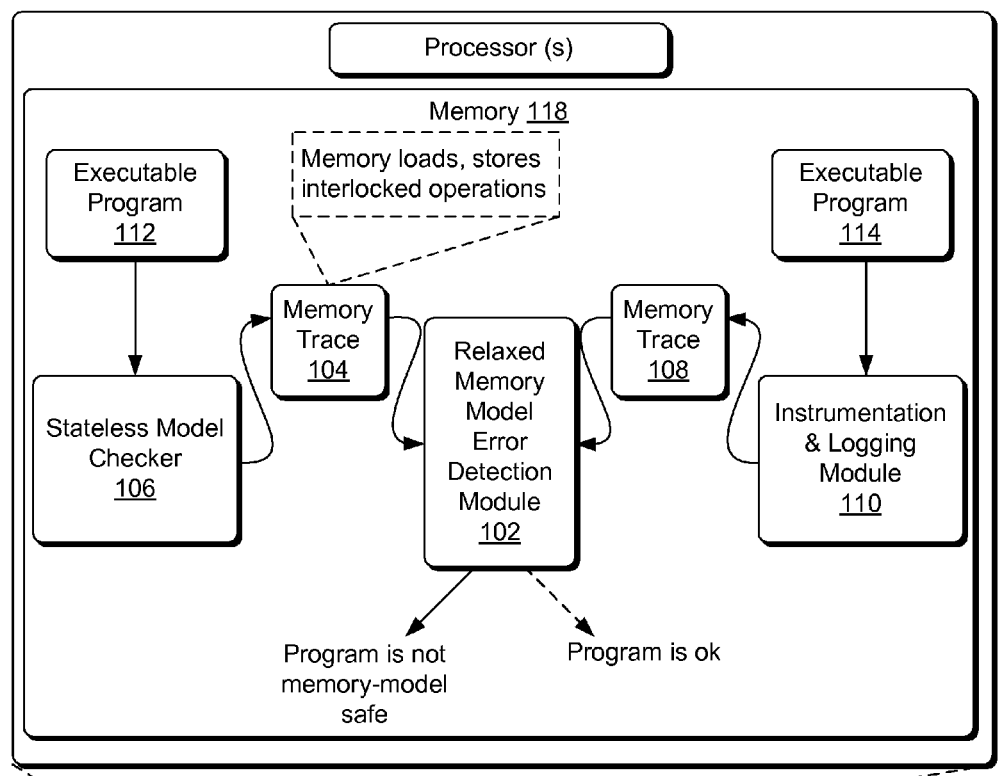
FIG. 1 depicts an illustrative relaxed memory model error detection system, showing two alternative embodiments. As illustrated, both embodiments include a detection module.

The following discussion targets techniques capable of finding bugs in a computer program caused by running on a machine having a relaxed memory model.

Multiprocessor computers are complicated systems, and writing software to take advantage of the processing power of a multiprocessor computer has proven challenging. One reason is the existence of a class of bugs that arises in multiprocessor computing systems having relaxed memory access models. This class of bugs includes undefined behaviors of a computer program that are only possible when the computer program is executed on a computer having a relaxed memory access model. One example of a relaxed memory model susceptible to this class of bugs is the Total Store Order, or TSO, memory model, as discussed below. Other relaxed memory models include 390, Relaxed Memory Order (RMO), Power PC (PPC), and Intel Architecture 32 (IA-32). While the techniques discussed herein consider a TSO memory model, the same techniques apply equally to these and other relaxed memory models.

More conservative memory models, meanwhile, may not be as susceptible to this class of bugs. One example of a conservative memory model is a sequentially consistent memory model, as discussed below. The class of bugs detected is typically encountered when a program written for a conservative memory model is executed on a computer having a relaxed memory model.

A memory access model, or memory consistency model, defines the behavior of a shared system memory. This model also defines how that shared system memory is accessed by processors in the system. For instance, a sequentially consistent memory model on a multiprocessor system limits access to the computer's shared memory such that only one processor at a time may read from or write to the shared system memory. By limiting access to one processor a time, and by ensuring that all memory access operations are completed before another processor is allowed to access the shared memory, the sequentially consistent memory model ensures a high level of memory integrity. For example, on a computer with a sequentially consistent memory model, the system prevents a processor from accessing a stale memory value by ensuring that all store instructions are committed to the shared system memory before a second processor is allowed to load a value from that memory address.

However, by limiting access to the shared system memory, a sequentially consistent memory model creates a performance bottleneck as processors will frequently idle while waiting for the processor currently accessing the shared system memory to finish. In order to allow parallel, concurrent access to the shared system memory, relaxed memory models have been designed to allow some balance of memory system integrity and overall system performance.

A computer having a TSO memory model typically includes more than one processor, and each processor includes a store buffer with store-load forwarding. Store-load forwarding enables a processor to store a value to its local store buffer (also called a cache) without committing that value to the shared system memory. By not committing the new value to the shared system memory, all of the other processors will access the stale value residing in the shared system memory until the new value is committed from the cache to the system memory. Additionally, a TSO memory model provides no guarantee as to when the new value stored in the first processor's store buffer will be committed to the shared system memory. As a consequence, programmers who do not properly consider this store buffer indeterminism will often write code that includes undefined or unexpected behaviors when executed on a TSO memory model. Because this undefined program behavior is almost always a bug, relaxed memory model bugs are defined as program behaviors that are possible when executed on a relaxed memory model but not possible when executed on a sequentially consistent memory model.

In other embodiments, computer systems comprising relaxed memory models may include hardware devices that reorder memory accesses, such as out-of-order or multiple-issue instruction pipelines, memory access buffers, data caches with asynchronous write-through, and/or victim buffers. In other embodiments, computer systems comprising relaxed memory models may include software components that reorder memory accesses, such as compilers performing optimizing program transformations that move, introduce, or eliminate memory accesses or synchronization instructions.

In one embodiment, relaxed memory model bugs are found in a test program by analyzing all possible program executions on a sequentially consistent memory model, and determining whether additional executions are possible on a relaxed memory model. A program execution (or interleaving) comprises a sequence in which a plurality of instructions of the test computer program are executed. For example, the first execution of an application typically begins at the beginning of the entry point function. If the application can be passed command line arguments, different executions are likely to exist within the entry point function. For instance, when a command line argument is passed to the application, an execution parsing and responding to the command line arguments will be executed. When the application is run without a command line argument, a different execution may be taken. Only by searching for bugs in all possible locations can all relaxed memory model bugs be found in the test application.

The number of potential executions contained in a given application can vary widely. In some cases, applications will be completely deterministic, and so there is only one execution for that test program. In other cases, applications may contain branching instructions or exception handling functions, but may or may not be executed. In still other cases, a test program may contain multiple threads, increasing the number of ways in which a series of instructions can be executed, due to the indeterminacy of the thread scheduler. Applications that respond to user input, network traffic, or any other random or pseudo-random input also may include a large number of possible executions. Importantly, the number of possible executions additionally depends on aspects of the computer on which the application is executing. For instance, on a computer having a sequentially consistent memory model, there may be fewer possible executions of the test program then the same program might have when executed on a computer having a relaxed memory model. By identifying executions that are only possible when executing on a computer having a relaxed memory model, relaxed memory model bugs can be identified. Minimal executions, which are executions that are only possible when executed on a computer having a relaxed memory model, are defined as borderline executions.

Relaxed memory model bugs are often introduced because the developer of the application assumed the application would always execute on a computer having a sequentially consistent memory model. Consequently, whenever borderline executions are possible, the additional executions may likely comprise bugs, because the additional executions are undefined or unexpected. Only when a computer having a relaxed memory model and a computer having a sequentially consistent memory model generate identical executions is the test program relaxed memory model safe.

FIG. 1 depicts an illustrative relaxed memory model error detection system 100. In one embodiment, a relaxed memory model error detection module 102 receives a memory trace 104 that was generated by a stateless model checker 106. The relaxed memory model error detection module 102 may be a software module running on a central processing unit or a hardware device similarly programmed (or a combination thereof). The relaxed memory model error detection module 102 may comprise a standalone computer application, or alternatively may be a module included or embedded in a generalized error detection application.

The memory trace 104 includes a series of memory access events. The memory access events comprise memory loads, memory stores, and interlocked memory operations. Each memory access event corresponds to a memory access instruction that was executed by a test program. The memory trace 104 may be passed to the detection module 102 on the fly, such as in the form of procedure calls, a message stream, or other forms of intra- or inter-process communication. Alternatively, the memory trace 104 may be passed to the detection module offline, such as by storing it to a trace file or another form of permanent or transient storage, from where the detection module 102 may read the memory trace at a later time.

The stateless model checker 106 receives an executable program 112 as input. The stateless model checker 106 processes the executable program 112, enumerating every possible execution on a sequentially consistent memory model. Alternatively, the stateless model checker 106 may enumerate a representative subset of every execution, wherein the representative subset of executions are sufficient to enable the relaxed memory model error detection module 102 to detect any borderline execution in the executable program 112.

The relaxed memory model error detection module 102 alternatively or additionally receives a memory trace 108. The memory trace 108 may similarly comprise memory access events, the memory access events comprising memory loads, memory stores, and interlocked memory operations. Again, the memory trace 108 may be passed to the detection module 102 on the fly, such as in the form of procedure calls, a message stream, or other forms of intra- or inter-process communication. Alternatively, the memory trace 108 may be passed to the detection module 102 offline, such as by storing it to a trace file or another form of permanent or transient storage, from where the detection module 102 reads the memory trace 108.

An instrumentation and logging module 110 generates the memory trace. The instrumentation and logging module 110 receives an executable program 114 as input, and instruments the executable program 114 such that when executed, memory instructions executed by the instrumented program 114 are trapped. Memory access events corresponding to the trapped memory access instructions are then created and added to the memory trace 108. In this way, instrumentation and logging module 110 enables tracing the memory access instructions that are actually executed by the executable program 114. Therefore it is possible that the executable program 114 contains undetected borderline executions that were not detected because the borderline executions were not actually executed. While merely tracing actual executions of an application may miss some borderline executions, it may be the only practical way to analyze a very large test program containing a very large number of executions to enumerate. An example of an application that is so large it may not efficiently enumerate all executions is Microsoft Word® or Microsoft Internet Explorer®.

Figures 2A, 2B:
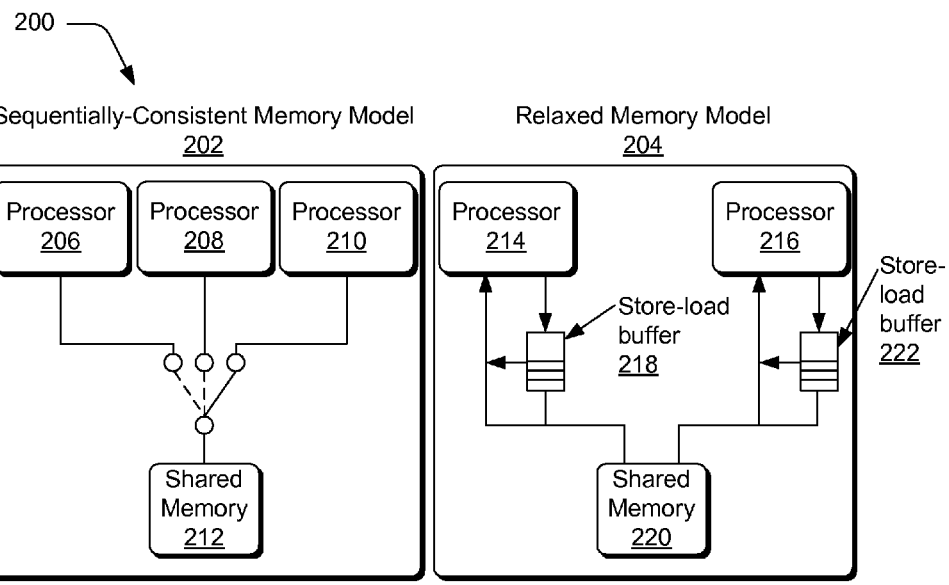
FIG. 2A depicts illustrative components of a sequentially consistent memory model and a relaxed memory model.
FIG. 2B depicts a conceptual implementation of store buffers.

FIG. 2A depicts illustrative components 200 of a sequentially consistent memory model and a relaxed memory model. Many implementations are contemplated, including software, hardware, and a combination thereof. A sequentially consistent memory model 202 may include multiple processors. While the sequentially consistent memory model is illustrated with three processors, any number of one or more processors is similarly contemplated. A processor 206, a processor 208, a the processor 210 are electrically connected to a shared memory 214. However, in the sequentially consistent memory model only one processor is granted access to the shared memory 214 at any one time.

As illustrated in FIG. 2B, a relaxed memory model 204 enables a processor 214 and a processor 218 to simultaneously access a shared memory 222. The processor 214 may comprise a store-load buffer 220. Alternatively, the processor 214 may be electrically connected to the store-load buffer 220. Similarly, the processor 218 may comprise a store-load buffer 222, or alternatively the processor 218 may be electrically connected to the store-load buffer 222. As will be explained below, the relaxed memory model 204 may execute the same code as the sequentially consistent memory model 202, yet obtain different results.

Figure 2C:
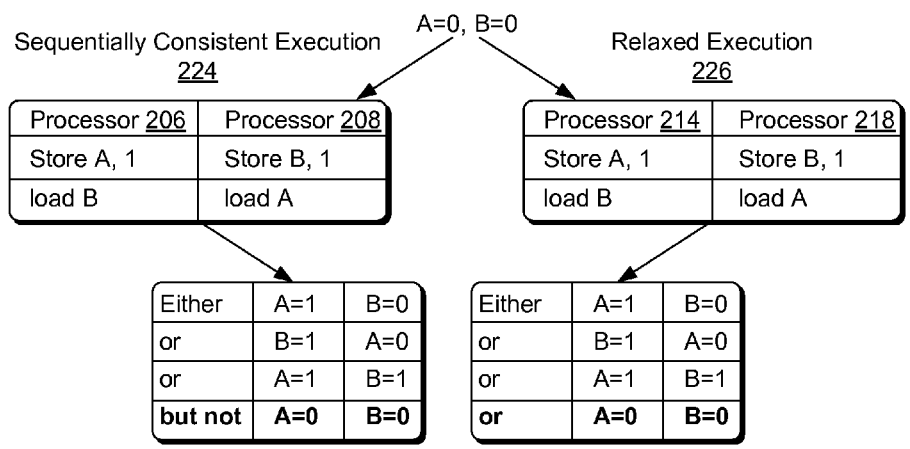

FIG. 2C illustrates the execution of a simple set of memory access instructions that may achieve different results based on which memory model they are executed on. Both a sequentially consistent execution 224 and a relaxed execution 226 operate on variables and A and B, with both initialized to "0" in the current example. The sequentially consistent execution 224 is about to execute instructions "Store A, 1" and "Store B, 1" simultaneously on processors 206 and 208, respectively. The second set of instructions, "Load B" and "Load A", look as if they will be executed immediately afterward. When executed by the sequentially consistent execution 224, there is no one set of resulting values for A & B: A may hold the value "0" while B holds "1", B may hold "1" while A holds "0", or both A and B may hold "1". However, it is not possible for both A & B to hold the value "0".

There are two initial possibilities to consider when executing these instructions on a sequentially consistent machine: either the processor 206 is granted access to the shared memory 214 first, or the processor 208 is granted access to the shared memory 214 first. If the processor at 206 is granted access to the shared memory 214 first, a value of 1 will be stored at location A. Because of the nature of the sequentially consistent memory model 202, the processor 208 will not be allowed to execute the "Store B, 1" execution until the processor 206 no longer has exclusive access to the shared memory 214. Alternatively, the processor 208 may be granted first access to the shared memory 214 first, in which case "Store B,1" will be executed first, and the processor 206 have to wait before executing "Store A,1".

Once the initial processor (either the processor 206 executing "Store A,1" or the processor 208 executing "Store B,1") has executed its first instruction, there are two additional possibilities. Either the initial processor will maintain exclusive access to the shared memory 214, and execute the second instruction before the other processor has executed its first instruction, or the initial processor will relinquish exclusive access to the shared memory 214 after executing its first instruction, and allow the other processor to execute its first instruction.

First consider the scenario when the first processor to execute completes execution before the other processor executes any of its instructions. If, for example, the processor 206 begins by executing "Store A,1", and does not relinquish the shared memory 214, the processor 206 will then execute "Load B", all before the processor 208 executes "Store B,1". Therefore, the value of "B" loaded from the shared memory 214 will be "0". Once the processor 208 is allowed to begin execution, "Store B,1" assigns 1 to "B" and "Load A" loads the value "1" into A. The sequence of instructions is as follows:

1) "Store A,1"
2) "Load B"
3) "Store B,1"
4) "Load A".

Therefore, this scenario yields a result of A=1 and B=0. The same sequence, but with the processor 208 executing first, will result in B=1 and A=0.

On the other hand, when one of the processors executes its first instruction, and then relinquishes access to the shared memory 214, the other processor may then execute its first instruction. In this scenario both variables will be assigned a value "1" before any of the "Load" instructions have been executed, resulting in both variables having the value "1".

While it is possible when executing these instructions on a sequentially consistent memory model to achieve any the three results listed above, there is no scenario where executing these memory access instructions results in both variables having the value "0".

However, as shown by the relaxed execution 226, executing the same memory access instructions on the relaxed memory model 204 allows this fourth possibility. This additional execution—a borderline execution, is possible due to the nature of the relaxed memory model 204. In this scenario, a processor 214 and a processor 218 both simultaneously execute their respective store instructions. Because these processors are executing in the relaxed memory model 204, they are both allowed to access the shared memory 222 concurrently. Additionally, the values stored in variables "A" and "B" may not be committed to the shared memory 222. Instead, the values stored in variables "A" and "B" may be cached in the local store-load buffers 220 and/or 222. When both processors concurrently execute the "Load B" and "Load A" instructions, both processors may read the stale value of "0" out of the shared memory 222, because the new values may have not yet been committed to the shared memory 222. This fourth execution is an example of a borderline execution because it only occurs when executed on a computer having a relaxed memory model.

FIG. 3 depicts an illustrative execution of two threads, including the "happens before" relationship and the relaxed "happens before" relationship used in one embodiment to identify borderline executions. A "happens before" (hb) relationship exists between two memory access events executed by a sequentially consistent memory model when it can be known that a first event will be executed earlier in time than a second event. Similarly, a "relaxed happens before" (rhb) relationship exists between the first and second memory access events on a relaxed memory model when it can be known that the first event will always be executed before the second event. The nature of the "happens before" and relaxed "happens before" relationships are such that the existence of either relationship between two memory access events implies the second event could never be executed before the first event. Inversely, if there is no "happens before" or relaxed "happens before" relationship between two memory access events, it is possible for the second event to be executed before the first event.

Typically, the second event can be executed before the first event on relaxed memory model when the first event is a "Store". This is true because the "Store" instruction only guarantees that the stored value exists in the buffer local to the processor that executed the instruction. There is no guarantee that the stored value has been committed to the shared system memory 224, and so it is possible that the second event will complete execution before the first event completes execution. In one embodiment, the relaxed memory model error detection module 102 may detect a borderline execution by locating two events for which a "happens before" relationship exists, but a "relaxed happens before" relationship does not exist, indicating that the memory access instructions are not relaxed memory model safe.

In one preferred embodiment, vector clocks are used to determine whether a "happens before", in the case of a sequentially consistent memory model, or a "relaxed happens before", in the case of a relaxed memory model, relationship exists. In other embodiments, the relaxed memory model error detection module 102 may construct a graph representing "happens before" and "relaxed happens before".

Figure 3A:
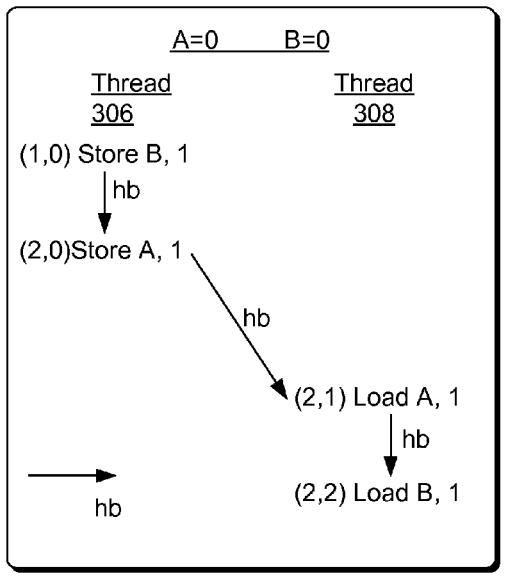
FIG. 3 depicts an illustrative execution of two threads, as well as the "happens before" relationships used to identify borderline executions.
Figure 3B:
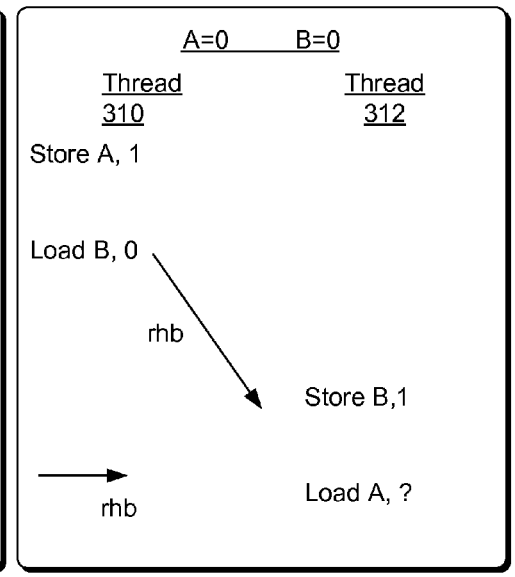

FIG. 3A graphically illustrates "happens before" relationships that exist between the listed memory access events. FIG. 3B graphically illustrates "relaxed happens before" relationships that exist between the listed memory access events.

In one embodiment, a memory access event includes a memory access type identifier, the memory address accessed by the memory access event (represented here by variables A and B), and a coherence index. The coherence index indicates which Load or Store instruction, in the sequence of Load and Store instructions, the current memory access event represents. For example, the memory access event "(1,0) Store B, 1" illustrates a "Store" event, wherein the value is stored in memory address "B", and the coherence index is "1" (because this is the first store instruction at address B).

A sequentially consistent memory module 302 includes a thread 306 and a thread 308, each thread executing on different processors (not shown). A "happens before" (hb) relationship exists between two memory access events when it can be known that the first event will always happen before the subsequent, second event. For example, by the sequential nature of execution on the sequentially consistent memory model 302, "(1,0) Store B,1" is known to complete before "(2,0) Store A, 1" will be executed. Therefore, a "happens before" relationship exists between "(1,0) Store B,1" and "(2,0) Store A,1".

Similarly, a "happens before" relationship exists between "(2,0) Store A,1" and "(2,1) Load A,1". In this case, the Store event begins execution before the Load event, and the Load event loads the value stored by the Store event, so due to the nature of the sequentially consistent memory model 302, the Store event is guaranteed to complete execution before the Load event executes.

Finally, "(2,1) Load A,1" has a "happens before" relationship with "(2,2) Load B,1" for the same reason "(1,0) Store B,1" has a "happens before" relationship with "(2,0) Store A, 1". Importantly, due to the transitive nature of the "happens before" relationship, in one embodiment it can be known that a "happens before" relationship exists between "(1,0) Store B,1" and "(2,2) Load B,1".

A relaxed memory model 304 includes a thread 310 and a thread 312, each thread executing on a different processor (not shown). A "relaxed happens before" (rhb) relationship exists between two memory access events when it can be known that one event will always happen before the subsequent event. In this example, there is no relaxed "happens before" relationship between "Store A,1" and "Load B,0", due to the store buffer associated with the processor executing the thread 310.

Similarly, "Store B,1" does not have a "relaxed happens before" relationship with "Load A,?". Due to the indeterminate nature of when a Store event will be committed to the shared system memory, it is not possible to know whether A will be loaded with the value 1, or 0. In order for there to exist a "happens before" relationship between "Store A,1" and "Load A,?", intervening memory access events must also have a "relaxed happens before" relationship, which is not the case in the relaxed memory model 304. It is possible for the "Store A,1" instruction to have stored the value "1" in the thread 310's store buffer without updating the shared system memory. In this case, the "Load A,?" instruction would load a "0". However, if the value "1" was committed before "Load A,?" is execute, the value loaded in "A" would be "1".

The execution exhibited in FIG. 3B is another example of a borderline execution: if the same code were executed on a sequentially consistent memory model, the final "Load" instruction would always load "1".

FIG. 3B does exhibit a relaxed "happens before" relationship between "Load B,0" and "Store B,1", because the Load is executed before the store, and due to the nature of a Load (which never has to wait for a store buffer to commit), "Load B,0" will always execute before "Store B,1".

In one embodiment, the existence of a "relaxed happens before" relationship can be determined in part by the use of vector clocks. Vector clocks are used in multiprocessor systems to identify causalities in concurrent executions of programs. In such a system, each processor includes an actual clock in addition to a pseudo-clock that shadows the remaining real clocks in the system. Each actual clock may be a timer, or alternatively the clock may be a sequence number that increments every time the clock is accessed. When a message is sent from a first processor to a second processor, the first processor creates a timestamp from the current state of its actual clock and its pseudo-clocks. Upon receipt at the second processor, the second processor will update its pseudo-clocks with values stored in the event's timestamp, merging the highest values from the second processor's existing pseudo-Clocks with the values stored in the event's timestamp.

Given two vector clock timestamps, it is possible to know which timestamp was created first in time by comparing the values of the timestamps to each other. If all of the values of a first timestamp are less than or equal to the respective values of a second timestamp, the first timestamp is known to have been created first.

Figure 4:
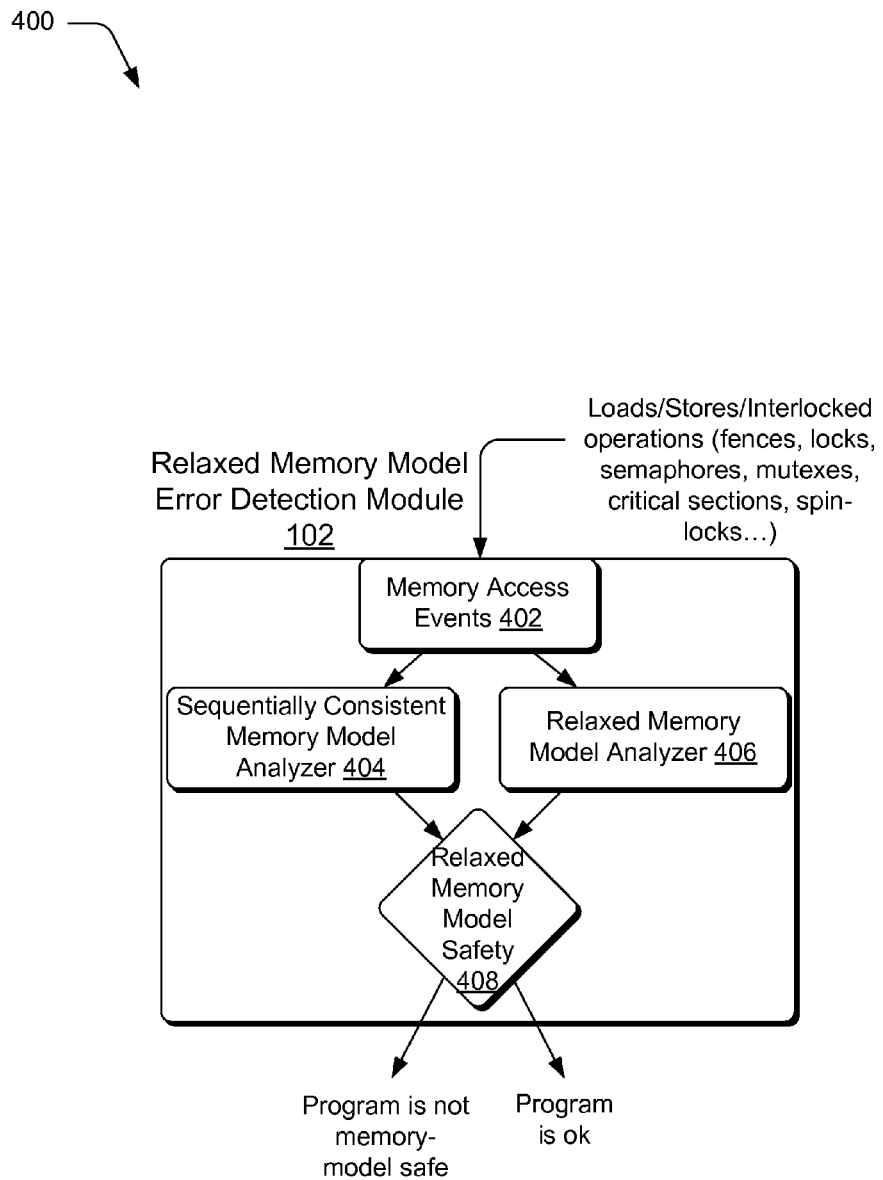
FIG. 4 depicts illustrative components of a relaxed memory error detection module.

FIG. 4 depicts illustrative components of a relaxed memory error detection module. The relaxed memory error detection module 102 receives a memory trace comprising memory access events 402, such as loads, stores, and interlocked memory operations. The interlocked memory operations may represent any kind of atomic operation, such as a memory fence, locks, semaphores, mutexes, critical sections, and spin locks, etc. Each of these operations is translated by the stateless model checker 106 into a generic Interlocked memory operation. Each execution contained within the memory trace is analyzed twice, once by a sequentially consistent memory model analyzer 404, and once by a relaxed memory model analyzer 406. In one embodiment, the sequentially consistent memory model analyzer 404 utilizes a traditional vector clock algorithm to determine the existence of "happens before" relationships. In one embodiment, the relaxed memory model analyzer 406 utilizes the novel vector clock algorithm listed below to determine the existence of relaxed happen before relationships.

The relaxed memory model analyzer 406 analyzes each memory access event $e_o \ldots e_n$ in an execution of some test program to determine the existence of "relaxed happens before" relationships. The relaxed memory model analyzer 406 utilizes the novel vector clock algorithm described below to calculate timestamps $t_o \ldots t_n$, such that a "relaxed happens before" relationship exists between events $e_i$ and $e_j$ if and only if $(i \leq j)$ and $(t_i[k] \leq t_j[k])$ for all k in $\{1, \ldots, 2N\}$.

Included below is one example of pseudo-code for calculating the vector clocks used in the above algorithm to determine whether or not a "relaxed happens before" relationship exists:

```
1   type      timestamp: array[2*N] of N_0;
2   var lc:   array[Proc] of timestamp;
3   sc:       array[Proc] of timestamp;
4   mc1:      array[Proc][Adr] of timestamp;
5   mc2:      array[Adr] of timestamp;
6   initially lc[*][*] := sc[*][*] = mc1[*][*][*] = mc2[*][*] = 0;
7   function merge(ts_1, ... ts_n : timestamp) returns timestamp {
8       return (max_i(ts_i[1]), ... , max_i(ts_i[N*2]));
9   }
10  function process_event(e : Evt) returns timestamp {
11      match e with
12          ld(p,i,a,c) ->
13              ts := merge(lc[p], mc1[p][a]);
14              ts[2*p] := ts[2*p] + 1; // advance load count for p
15              lc[p] := merge(lc[p], ts);
16              mc2[a] := merge(mc2[a], ts);
17          st(p,i,a,c) ->
18              ts := merge(sc[p], lc[p], mc2[a]);
19              ts[2*p+1] := ts[2*p+1] + 1; // advance store count for p
20              forall q 6= p do
21                  mc1[q][a] := merge(mc1[q][a], ts);
22              mc2[a] := merge(mc2[a], ts);
23              sc[p] := merge(sc[p], ts);
24          il(p,i,a,c) ->
25              ts := merge(sc[p], lc[p], mc2[a]);
26              ts[2*p] := ts[2*p] + 1; // advance load count for p
27              ts[2*p+1] := ts[2*p+1] + 1; // advance store count for p
28              forall q 2 Proc do
29                  mc1[q][a] := merge(mc1[q][a], ts);
30              mc2[a] := merge(mc2[a], ts);
31              lc[p] := merge(lc[p], ts);
32              sc[p] := merge(sc[p], ts);
33          return ts;
34  }
```

Finally, in one embodiment a relaxed memory model safety algorithm 408 analyzes the "happens before" and "relaxed happens before" relationships calculated above to determine if the memory access events 402 are relaxed memory model safe. The relaxed memory model safety algorithm 408 searches for borderline executions, which comprise two events for which there exists a "happens before" relationship, but not a "relaxed happens before" relationship. The existence of a borderline execution indicates that a memory access instruction can be executed in a different order on a computer having a relaxed memory model, which means the memory access events 402 are not relaxed memory model safe. Additionally, the relaxed memory model safety algorithm 408 ensures that for each event in an execution, all of the previously executed events in that execution have a "happens before" relationship with that event. Included below is the pseudo-code for ensuring relaxed memory model safety:

```
1   function is_store_buffer_safe(e_1 e_2 ... e_n) returns boolean {
2       var k,p,a,c : N; var E : T ;
3       E := Ø;
4       for (k := 1; k <= n; k++) {
5           if (o(e_k) = ld) {
6               p := p(e_k); a := a(e_k); c := c(e_k);
7               while (c > 0) {
8                   if (p = i(write(E,a,c)))
9                       break;
10                  if (write(E,a,c) !_{-rhb} lastR(E,p))
11                      break;
12                  if (write(E,a,c) !_{-hb} last(E,p))
13                      return false;
14                  c := c - 1;
15              }
16          }
17          E := E U e_k;
18      }
19      return true;
20  }
```

Figure 5:
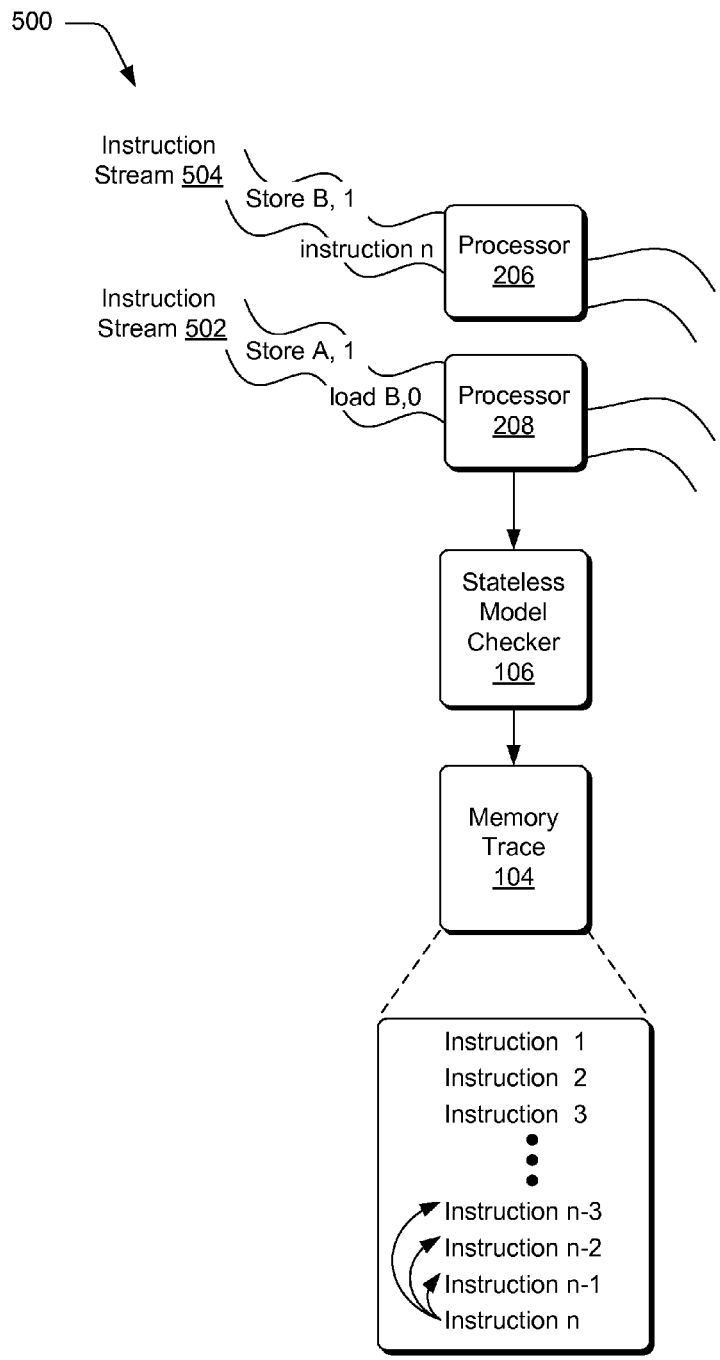
FIG. 5 depicts an illustrative process for deriving a memory trace from an execution stream, and analyzing the memory access instructions to determine if they could be executed in a different order.

FIG. 5 depicts an illustrative environment 500 for deriving a memory trace from an execution stream, and analyzing the memory access instructions to determine if they could be executed in a different order.

An instruction stream 502 is executed by the processor 202. Additionally, an instruction stream 504 is executed by the processor 204. The stateless model checker 106 extracts memory access instructions from the processors 202 and 204, and generates the memory trace 104. The memory trace 104 is analyzed by the relaxed memory model error detection module 102 to determine if there exist any borderline executions in the memory trace 104. The relaxed memory model error detection module 102 determines if any borderline executions exist by analyzing each instruction to see if that instruction could have been executed before any of the previously executed instructions on a computer having a relaxed memory model.

Figure 6:
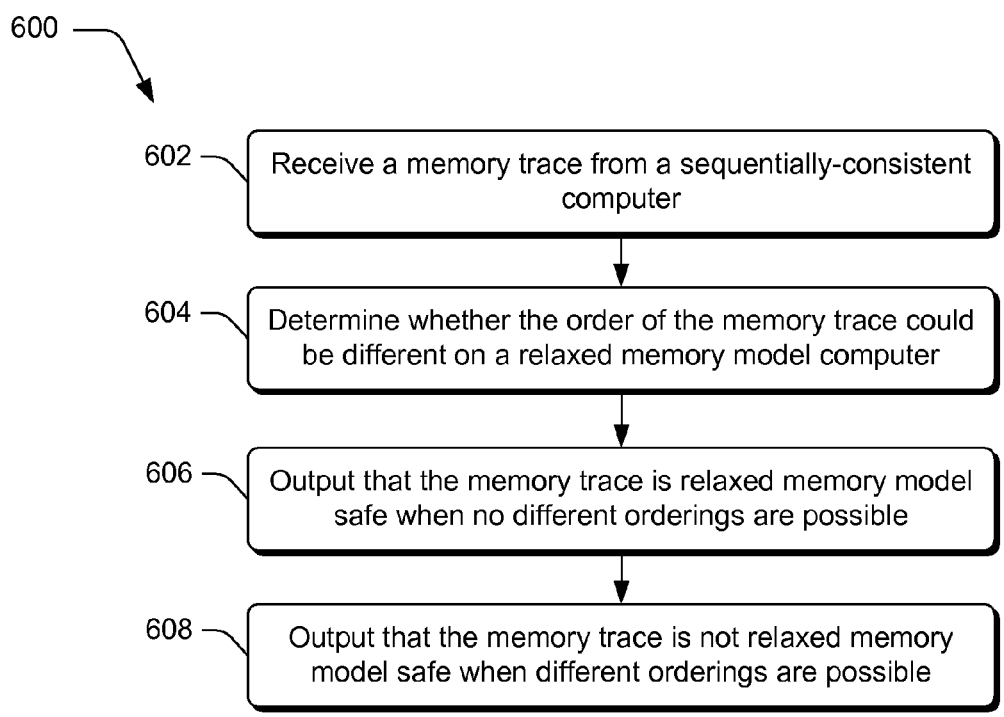
FIG. 6 depicts an illustrative process for determining if a memory trace representing memory access instructions exhibits relaxed memory model bugs.

FIG. 6 depicts an illustrative process for determining if a memory trace representing memory access instructions exhibits relaxed memory model bugs. Operation 602 represents receiving a memory trace generated from executing a test program on a sequentially consistent computer. Operation 604, meanwhile, determines whether the memory access instructions represented by the memory trace could be executed in a different order on a relaxed memory model computer. Operation 606 outputs an indication that the memory access instructions represented by the memory trace are relaxed memory model safe when it is not possible for the memory access instructions to be executed in a different order. Operation 608 outputs an indication that the memory access instructions represented by the memory trace are not relaxed memory model safe when it is possible for the memory access instructions to be executed in a different order.

Figure 7:
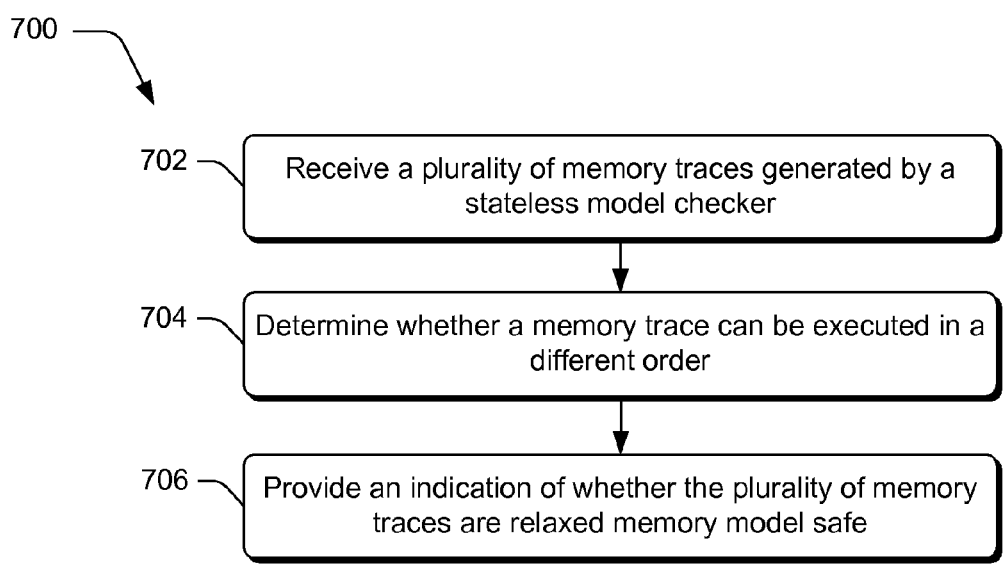
FIG. 7 depicts an illustrative process for determining if a memory trace representative of all possible memory traces of a test program exhibit relaxed memory model bugs.

FIG. 7 depicts an illustrative process for determining if a memory trace representative of all possible memory traces of a test program exhibit relaxed memory model bugs. Operation 702 represents receiving a plurality of memory traces generated by a stateless model checker. Operation 704, meanwhile, determines whether any of the memory access instructions represented by the memory trace could be executed in a different order on a computer having a relaxed memory model. Operation 706 provides an indication whether or not the plurality of memory traces are relaxed memory model safe.

Figure 8:
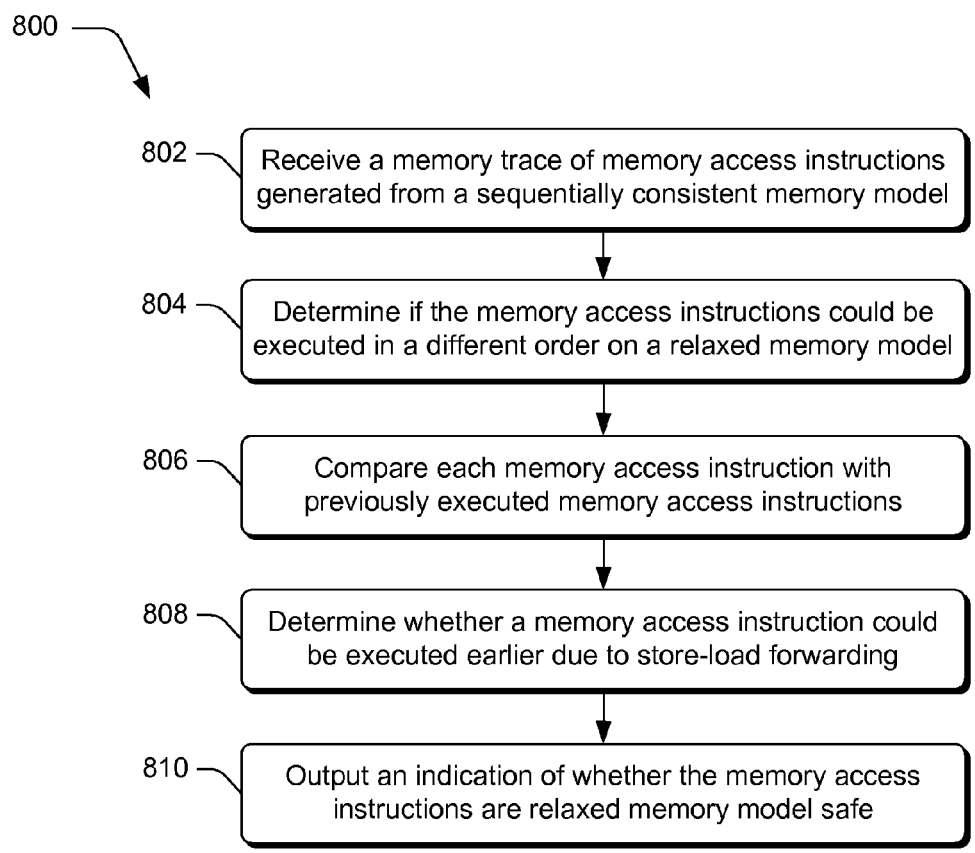
FIG. 8 depicts an illustrative process for determining if a memory trace representing memory access instructions exhibits relaxed memory model bugs.

FIG. 8 depicts an illustrative process for determining if a memory trace representing memory access instructions exhibits relaxed memory model bugs. Operation 802 receives a memory trace comprising memory access instructions generated from a sequentially consistent memory model. Operation 804, meanwhile, determines if the memory access instructions could be executed in a different order when executed on a computer having a relaxed memory model. Operation 806 determines whether the memory access instructions could be executed in a different order when executed on a computer having a relaxed memory model by comparing each memory access instruction with previously executed memory access instructions. Operation 808 determines whether a memory access instruction could be executed before one of the previously executed memory access instructions due to store-load forwarding. Operation 810 outputs an indication of whether or not the memory access instructions are relaxed memory model safe.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer-readable hardware storage devices storing computer-executable instructions that, when executed on one or more processors, perform acts comprising:
    receiving a memory trace comprising a plurality of memory access events, each of the plurality of memory access events representing the execution of a memory access instruction by a computer having a sequentially consistent memory model, wherein the plurality of memory access events are stored in a first order, the first order corresponding to an order in which the represented memory access instructions were executed;
    generating, for each of the plurality of memory access events, a target memory location, an issue index based on the order in which the event was executed by a processor, and a coherence index based on the number of previously executed memory access events that accessed the target memory location;
    determining whether the memory access instructions could, when executed on a computer having a relaxed memory model, be executed in a second order based at least in part on:
        computing a transitive happens-before relation that considers at least one ordering constraint that a memory model under consideration imposes on at least one memory access issued by a test program; and
        comparing the issue index and the coherence index of a memory access event with the issue indices and coherence indices of memory access events recorded before the memory access event, wherein the second order is different from the first order;
    when the memory access instructions could be executed in the second order, outputting an indication that the memory access instructions are not relaxed memory model safe; and
    when the memory access instructions could not be executed in an order different than the first order, outputting an indication that the memory access instructions are relaxed memory model safe.

2. One or more computer-readable hardware storage devices as recited in claim 1, wherein each memory access event comprises at least one of the following: a memory store event, a memory load event, or an interlocked memory event.

3. One or more computer-readable hardware storage devices as recited in claim 1, wherein the computer having a relaxed memory model comprises a first processor communicatively coupled to a first store buffer, a second processor, and a shared memory comprising a memory location communicatively coupled to the first store buffer, wherein a new value stored in the first store buffer by the first processor is not accessible to the second processor until the new value is committed to the memory location, and wherein during the time between when the new value is stored in the first store buffer and when the new value is committed to the memory location, the second processor is capable of loading an old value stored at the memory location.

4. One or more computer-readable hardware storage devices as recited in claim 1, wherein the relaxed memory model includes a Total Store Order (TSO) memory model.

5. One or more computer-readable hardware storage devices as recited in claim 1, wherein the computer having a relaxed memory model includes store buffers with store-load forwarding.

6. One or more computer-readable hardware storage devices as recited in claim 1, wherein the memory trace comprises memory access events from a plurality of executions of a program.

7. One or more computer-readable hardware storage devices as recited in claim 6, wherein the memory trace is generated by a stateless model checker that systematically enumerates executions of the program on a computer.

8. One or more computer-readable hardware storage devices as recited in claim 1, wherein a happens-before relationship exists between a first memory access event and a second memory access event when:
the first memory access event and the second memory access event are issued by a same processor;
the issue index of the first memory access event is less than the issue index of the second memory access event;
the coherence index of the first memory access event is the same as the coherence index of the second memory access event;
the first memory access event is a write access;
the second memory access event is a read access;
the first and second memory access event access the same memory address; and
the coherence index of the first memory access event is less than the coherence index of the second memory access event and at least one of the first memory access event and the second memory access event is a write access.

9. One or more computer-readable hardware storage devices as recited in claim 1, wherein a happens-before relationship exists between a first memory access events and a second memory access event when:
the issue index of the first memory access event is less than the issue index of the second memory access event;
a memory address of the first memory access event is the same as a memory address of the second memory access event;
one of the first memory access event and the second memory access event writes a value to the memory address;
the other of the first memory access event hand in the second memory access event reads a value from the memory address; and
the coherence index of the first memory access event is less than the coherence index of the second memory access event.

10. One or more computer-readable hardware storage devices as recited in claim 1, wherein determining whether the memory access instructions could be executed in a second order is based at least in part on determining when there exists a relaxed happens-before relationship between each memory access event and every subsequent memory access event in the memory trace, wherein a relaxed happens-before relationship exists when:
there exists a happens-before relationship; and
the first memory access event is not a store event and the second memory access event is not a load event.

11. One or more computer-readable hardware storage devices as recited in claim 1, wherein the acts further comprise:
generating, by a vector clock, a timestamp for each memory access event, the timestamp comprising two values for each of the one or more processors, such that a relaxed happens-before relationship exists between a first memory access event and a second memory access event when:
all values of the timestamp associated with the first memory access event are strictly less than the corresponding values of the timestamp associated with the second memory access event; and
wherein determining whether the memory access instructions could be executed in a second order is based at least in part on determining if a relaxed happens-before relationship does not exist between a memory access event and any memory access event executed before the memory access event.

12. One or more computer-readable hardware storage devices as recited in claim 1, wherein the memory trace includes memory access events generated by a non-exhaustive execution of a test program.

13. A method comprising:
receiving a plurality of memory traces at a relaxed memory model error detection module, each memory trace comprising an interleaved execution of a program, each interleaved execution comprising one or more memory access events arranged in a first order, each memory access event representing the execution of a memory access instruction by a computer having a sequentially consistent memory model, the plurality of memory traces generated by a stateless model checker;
generating, for each of the plurality of memory access events, a target memory location, an issue index based on the order in which the event was executed by a processor, and a coherence index based on the number of previously executed memory access events that accessed the target memory location;
determining at the relaxed memory model error detection module whether any of the plurality of memory traces could, when executed on a computer having a relaxed memory model, be executed in an order different from the first order based at least in part on:
computing a transitive happens-before relation that considers at least one ordering constraint that a memory model under consideration imposes on at least one memory access issued by a test program; and
comparing the issue index and the coherence index of a memory access event with the issue indices and coherence indices of memory access events recorded before the memory access event;
providing an indication that the program is relaxed memory model safe based at least in part on whether any of the plurality of memory traces could be executed in an order different from the first order,
wherein the program is relaxed memory model safe if none of the interleaved executions could be executed in an order different from the first order,
and wherein the program is not relaxed memory model safe if any of the interleaved executions could be executed in an order different from the first order.

14. A method as described in claim 13, wherein the interleaved executions of the program comprise a representative strict subset of all possible interleaved executions.

15. One or more computer-readable storage devices as recited in claim 1, wherein the acts further comprise:
identifying a specific memory access instruction that could be executed in a different order,
wherein the instruction could be executed in a different order if the instruction is a load instruction executed on a first processor that when executed on a computer having a sequentially consistent memory model must wait for a store instruction executed on a second processor to be committed to a shared memory, but when executed on a computer having a relaxed memory model may execute immediately.

16. A method as described in claim 13 further comprising:

identifying a specific memory access instruction that could be executed in a different order, wherein the instruction could be executed in a different order if the instruction is a load instruction executed on a first processor that when executed on a computer having a sequentially consistent memory model must wait for a store instruction executed on a second processor to be committed to a shared memory, but when executed on a computer having a relaxed memory model may execute immediately.

17. A computer system comprising:

one or more processors;

memory, accessible by the one or more processors;

a relaxed memory model error detection module stored in memory and executable on the one or more processors to:

receive a memory trace generated by a stateless model checker that systematically enumerates executions of a computer program on a multi-processor computer having a sequentially consistent memory model, the memory trace comprising a plurality of memory access events, each of the plurality of memory access events representing the execution of a memory access instruction by the multi-processor computer, wherein the plurality of memory access events are stored in a first order, the first order corresponding to an order in which the represented memory access instructions were executed;

determine whether the memory access instructions could, when executed on a multi-processor computer having a relaxed memory model that comprises store buffers with store-load forwarding, be executed in a second order, the second order being different from the first order, the determining based at least in part on:

comparing a memory access event of an interleaved program execution with a set of memory access events of the interleaved program execution that were executed before the memory access event and after a most recently executed interlocked memory operation; and determining whether a memory access event could have been executed before one of the set of memory access events when executed on the multi-processor computer having a relaxed memory model that comprises store buffers with store-load forwarding by identifying a load instruction that could be executed earlier due to store-load forwarding than was allowed on the multi-processor computer having a sequentially consistent memory model;

when the memory access instructions could be executed in the second order, outputting an indication that the memory access instructions are not relaxed memory model safe; and when the memory access instructions could not be executed in an order different than the first order, outputting an indication that the memory access instructions are relaxed memory model safe.

18. The computer system as recited in claim 17, further comprising:

generating, for each of the plurality of memory access events, a target memory location, an issue index based on the order in which the event was executed by a processor, and a coherence index based on the number of previously executed memory access events that accessed the target memory location; and wherein determining whether a memory access event could have been executed before one of the set of memory access events is based at least in part on comparing the issue index and the coherence index of a memory access event with the issue indices and coherence indices of each memory access event of the set of memory access events.

19. The computer system as recited in claim 17, wherein determining whether a memory access event could have been executed before one of the set of memory access events is based at least in part on determining if a happens-before relationship exists between a pair of events and no relaxed happens-before relationship exists between the pair of events.

* * * * *